United States Patent [19]

Herman et al.

[11] 4,210,572

[45] Jul. 1, 1980

[54] COUPLING AGENTS FOR THERMOSETTING COMPOSITES

[75] Inventors: Daniel F. Herman, Princeton; Francis C. Naughton, Mountainside, both of N.J.

[73] Assignee: NL Industries, Inc., New York, N.Y.

[21] Appl. No.: 937,748

[22] Filed: Aug. 29, 1978

[51] Int. Cl.$^2$ .............................................. C08K 9/04
[52] U.S. Cl. ........................... 260/40 R; 260/37 EP; 260/37 N; 260/38; 260/39 R; 260/410.6
[58] Field of Search ................ 260/410.6, 40 R, 37 N, 260/37 EP, 38, 39 R

[56] References Cited

U.S. PATENT DOCUMENTS

| | | | |
|---|---|---|---|
| 1,970,578 | 8/1934 | Schoeller et al. | 260/410.6 X |
| 2,970,127 | 1/1961 | Slayter et al. | 260/40 R X |
| 3,779,981 | 12/1973 | Ward | 260/40 R |
| 3,823,219 | 7/1974 | Ward et al. | 260/42.14 X |
| 3,920,597 | 11/1975 | Nicks et al. | 260/40 R X |
| 4,126,593 | 11/1978 | Takahashi et al. | 260/42.14 X |

*Primary Examiner*—Sandra M. Person

*Attorney, Agent, or Firm*—Gary M. Nath

[57] ABSTRACT

Novel thermosetting resin composites containing an inorganic filler material and a coupling agent are provided which include a coupling agent selected from the group consisting of (1) mono-, di-, and tri-long chain fatty acid esters of $C_1$ to $C_4$ mono and polyhydric alcohols; (2) polyoxyalkylene glycols and mono alkyl ethers of polyoxyalkylene glycols; and (3) polyoxyethylene derivatives of mono-, di-, and tri-hydroxy fatty acid esters of $C_1$ to $C_4$ mono- and polyhydric alcohols. The novel coupling agents are particularly useful in reducing the viscosity of highly loaded filler-prepolymer pastes to improve the dispersion of the filler and to promote interaction between the filler and the prepolymer so as to maintain and/or improve the properties of the final cured resins. The composites incorporating the coupling agents are useful in the manufacture of fiber glass reinforced sheet molding compounds (SMC) or bulk molding compounds (BMC), as well as in the production of laminating resins for use in spray-laminate operations.

14 Claims, No Drawings

COUPLING AGENTS FOR THERMOSETTING COMPOSITES

The present invention relates to surfactant coupling agents for the treatment of fillers employed in thermoset resins. Such coupling agents serve to reduce the viscosity of loaded filler-prepolymer pastes to improve the dispersion of the filler and to promote interaction between the filler and the prepolymer so as to maintain and/or improve the properties of the final cured resins.

In view of the recent shortages of petroleum feedstocks which are necessary to manufacture thermosetting resins such as polyesters, epoxies, polyurethanes, phenolics, and melamines, and the expectation that such shortages will continue, there has arisen a need to incorporate larger volumes of inexpensive filler products into such polymers. The fillers function as extenders, and in certain cases, as reinforcing aids to improve the mechanical properties of the polymers in which they are incorporated.

Coupling agents or adhesion promoters are often used in filled thermoset composites to aid in the incorporation of filler into the polymer and to form an adhesive bond therebetween. Such coupling agents become more essential as higher loadings of filler are incorporated into the resins. The problems of using fillers in thermoset applications and the need for suitable coupling agents to aid in such use results from the complex problem of reducing viscosities in the resin-filler blend to within processible limits and at the same time ensuring that the physical properties of the molded parts are not harmed and are in fact improved, particularly in the case where high loadings are involved.

The primary emphasis in the literature on coupling agents for fillers used in the preparation of thermosetting resin composites has been on silane and titanate based materials. Examples of silanes which have been employed as coupling agents include materials containing epoxy, amine, mercaptan, 3-chloropropyl, cationic styryl, phenyl and methacrylate functional groups. The organic titanates which have been used as coupling agents have included tristearyl titanate and titanium methacrylate derivatives thereof. However, the prior art silanes and titanates have been found to be minimally effective in reducing viscosity in the filler-prepolymer pastes and, in some cases, to detract from surfactant properties.

A new class of filled thermosetting resin compositions employing a surfactant coupler has now been found which surpasses prior art systems in that it makes possible the maximization of the benefits of special properties of certain fillers, e.g., aluminum trihydrate (ATH), the minimization of viscosity even at the high loadings which are desirably employed as a means of lowering costs and, the optimization of physical properties in the molded plastic itself. Such compositions comprise a thermosetting resin which contains an inorganic mineral filler and, in one embodiment of the present invention, a coupling agent which is selected from the group consisting of mono-, di-, and tri-long chain fatty acid esters of $C_1$ to $C_4$ mono and polyhydric alcohols. Preferably, coupling agents manufactured from this class of compounds will be selected from the group consisting of the mono-, di-, and tri-esters of hydroxy fatty acids or acetyl derivatives thereof including specifically the mono-, di-, or tri-esters of acetyl ricinoleic acid, acetyl stearic acid, ricinoleic acid, and hydroxy stearic acid. Specific examples of such compounds would include castor oil, hydrogenated castor oil, methyl palmitate, methyl oleate, methyl acetyl ricinoleate and methyl ricinoleate.

In another embodiment of the present invention, the coupling agents comprise compounds selected from the group consisting of polyoxyalkylene glycols and monoalkyl ethers of polyoxyalkylene glycols. More particularly, such coupling agents may comprise a polyoxyethylene glycol having from about 8-300 ethylene oxide (EO) units, and preferably from about 10-35 EO units, said EO units having the general formula:

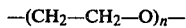

where n is from about 8-300 and preferably from about 10-35. Additionally, such coupling agents may comprise a polyoxypropylene glycol having from about 10-60 propylene oxide (PO) units, such propylene oxide units having the general formula:

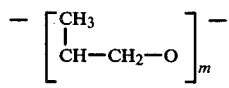

where m is from about 10-60. Still further, such coupling agents may comprise a block copolymer of a polyoxyethylene glycol having from about 2-300 EO units and a polyoxypropylene glycol having from about 10-60 propylene oxide units, such compounds being represented by the following general formula:

where n is from about 1-150 and m is from about 10-60.

In the case where the coupling agent comprises a monoalkyl ether of a polyoxyalkylene glycol, specific examples of such compounds would include Tergitol 15-S-9 and Tergitol 15-S-40 manufactured by Union Carbide which comprise $C_{11}$ to $C_{15}$ linear alcohols, ethoxylated with approximately 9 and 40 moles of ethylene oxide, respectively. In the case where the coupling agents of the present invention comprise a polyoxyethylene glycol, specific examples of such compounds would include Plurocol E400, Plurocol E600, and Plurocol E1500, all of which are manufactured by Wyandotte Chemicals Corp. and comprise polyethylene oxide having an average of 9, 13, and 34 ethylene oxide units, respectively. An example of a coupling agent comprising a polyoxypropylene glycol in accordance with the present invention would include Pluronic 31RL manufactured by Wyandotte Chemicals Corp. which comprises polypropylene oxide having an average of 53 propylene oxide units therein. Finally, examples of block copolymers of a polyoxyethylene glycol and a polyoxypropylene glycol in accordance with the present invention would include Pluronic F108 and Pluronic L31, such compounds being represented by the general formula:

where, in the case of Pluronic F108, n=140 on the average and m=56, and, in the case of Pluronic L31, n=1.14 on the average and m=16.

In still a further embodiment of the present invention, the coupling agents comprise polyoxyethylene derivatives of compounds selected from the group consisting of mono-, di-, and tri-hydroxy fatty acid esters of $C_1$ to $C_4$ mono or polyhydric alcohols. More particularly, such coupling agents comprise polyoxyethylene derivatives of mono-, di-, or tri-esters of ricinoleic acid, or hydroxy stearic acid and include an average of from about 1–100 ethylene oxide units, and preferably from about 30–75 ethylene oxide units per hydroxy group. Specific examples of such compounds include tri-esters of ricinoleic acid having an average of 1.7, 14.6 or 31 ethylene oxide units per chain. Such compounds are available from NL Industries, Inc. under the trade names Surfactol 318, Surfactol 365, and Surfactol 380 respectively. Still a further specific example of such compounds comprises the tri-ester of hydroxy stearic acid which includes an average of 71 ethylene oxide units on each hydroxy group. Such compound is also available from the NL Industries, Inc. under the table name Surfactol 590.

The coupling agents of the present invention may be used with a variety of inorganic mineral fillers including silicas, metal silicates, metal oxides, hydrated aluminum oxides, antimony trioxide, calcium carbonate, and combinations thereof. Additionally, the thermosetting resins from which polymer-filler systems employing the coupling agents of the present invention are prepared may include polyesters, epoxides, polyurethanes, phenolics, and melamines. Typically, the coupling agent will be present in an amount of from about 0.2–3% by weight of the filler, and preferably about 1% by weight of the filler, and may be included in the resin-filler blend in accordance with techniques known generally in the art. For example, the coupling agent may be coated onto the filler prior to incorporation of the filler into the resin, or may be employed by simply adding the coupling agent directly to the thermosetting resin followed by dispersion of the filler therein.

In a preferred embodiment of the present invention, the coupler compositions of the present invention are used to prepare resin-filler blends of polyester incorporating aluminum trihydrate (ATH) filler. ATH is well recognized as a low-cost flame retardant filler since it undergoes an endothermic release of water vapor at 230°–300° C. which will quench a flame and reduce smoke. The flame retardant effect increases at high loadings and it has been shown in the art that at 200 phr, molded parts will meet the Underwriter's Laboratory electrical and small-scale flame standards. Polyester pastes loaded at this level, however, have such excessive viscosities that they cannot be processed on an SMC machine. In this regard, however, high filler loadings are particularly desirable since they result in significant cost reductions. For example, ATH at 200 phr is additionally beneficial since the cured polyester is rendered flame retardant without requiring the usual expensive antimony oxide and halogenated polyester addition. As will be shown in the detailed examples hereinbelow, the filler-surfactant coupler combinations of the present invention, have resulted in 50% or more reduction in the paste viscosity so that processability and flame retardancy can both be achieved. This significantly improves the processing of the paste on an SMC machine and materially improves the wetting and dispersion of the reinforcing fiber glass by the paste.

Thus, the molded articles formed from the filler and glass loaded pastes prepared in accordance with the present invention can be used in automobile manufacture on hoods, trunk covers, panels and the like, as well as in boats, appliance housings and parts, and in housings and parts for electrical equipment and electronic instruments. Still other applications in the industrial area include tanks, pipes, dies, molds, and other plant equipment. Additionally, while the coupling agents of the present invention are particularly advantageous in highly filled systems, the viscosity reduction and coupling properties are also beneficial in polyester formulations which normally employ lower filler loadings. Examples of such formulations include spray laminate applications, fiber glass cloth-laminates, and fiber glass-polyester body solders. In such applications, increased filler loadings can be employed without harmfully affecting the rheology and flow properties of the loaded prepolymer.

The following examples are given to illustrate the present invention, but are not deemed to be limiting thereof. All percentages given are based upon weight unless otherwise indicated.

EXAMPLES 1-25

Evaluation of surfactant-coated fillers incorporated in polyester resin composites in accordance with the present invention, and a comparison with prior art couplers was accomplished using a Daniel flow-point test method as described in F. K. Daniel, National Paint Varnish & Lacquer Association, Scientific Circulars, 744 and 745, Oct., 1950. The method identifies two endpoints: "wet-out," i.e. when the filler particles clump together to form one homogenous mass; and "flow point," i.e. when the filler particles have sufficient lubrication to flow off the tip of a spatula with the last drop breaking as a thread of material which snaps back. The test gives an estimate of the homogeneity of the coating as well as the ease of lubrication of the particles. It correlates well with the viscosity of resin pastes, i.e. samples with low flow points usually yield low viscosity pastes. The test is performed by titrating a 5.0 g portion of the filler in a Petri dish with a 25% concentration of resin (Hatco's GR13034) dissolved in styrene monomer. The solution is worked into the filler using a spatula and the volume of solution used to reach each endpoint is read directly from the buret.

The following full polyester formulation was used in preparing the pastes, prior to addition of fiberglass:

| Component | Manufacturer's Identification | phr |
|---|---|---|
| isophthalate modified polyester resin | Hatco's GR13034 | 60 |
| low profile additive | Union Carbide's Bakelite LP40A | 30 |
| styrene | — | 10 |
| zinc stearate | Penick's Zn stearate PM | 4 |
| filler (treated or untreated) | Alcoa's 331 ATH or Campbell's Camel-Wite | 140, 175, 200 |

Alumina trihydrate (ATH) filler surfaces were coated with 1% of the coupling agent being tested (based on filler weight) by using a Twin Shell Blender. The uncoated filler was placed in the Blender cone and a 1% amount of coupler (prepared as an 8%–10% solution in solvent) added via the liquid-dispersion bar over a 5–15 minute period. After this initial application, the spinning of the dispersion (breaker) bar was discontinued and the cone allowed to rotate independently for a one-hour time span to promote uniform dispersion of the coupler. Following this, the coated filler was removed from the cone and dried in trays in a 75° C. forced-air oven for 16 hours to remove the solvent. After drying, soft agglomerates were broken by mild shearing action.

The polyester-filler combination was then prepared by dispersing the resin and low profile additive in a Cowles dispersator at low shear (20 volts) for 0.5 to 1.0 minute. The styrene was then added while mixing was in progress and after another 0.5 to 1.0 minute, the zinc stearate added as well. Following still another 0.5 to 1.0 minute, the filler was added in increments; each increment being allowed time for complete wet-out before addition of the next. As necessary, the voltage was increased in 5% intervals (up to a maximum of 45 volts) to permit better dispersion in the increasingly viscous medium. After all the filler had been added, the shearing was continued for an additional 5 minutes to insure complete uniformity. During this time, the paste temperature was maintained below 50° C.

As noted above, rather than coating of the filler with the coupler, it will be understood that the coupler may be pre-added to the polyester mix by dissolving 1–3% (based on filler weight) of the coupler in the styrene component of the polyester formulation and dispersing it simultaneously with the styrene prior to the incorporation of the filler.

In Table I below are listed the "wet-out" and "flow points" for the various compounds tested as described hereinabove. The values given are in milliliters of a 25% polyester-75% styrene solution required by a 5 g sample of coated filler to reach the two endpoints. Each sample was tested a minimum of 3 times to obtain the average deviation. As shown in Table I, the ATH uncoated control gave values of 1.58±0.4 and 2.45±0.08 for wet-out and flow points respectively. The upper flow point number is more indicative of surfactant and coupling properties and the materials are rated numerically according to the following scale of values for flow point:

| RATING | FLOW POINT |
|---|---|
| 1. Highest efficiency | <2.00 |
| 2. Better than control | 2.00–2.20 |
| 3. Slightly better | 2.20–2.35 |
| 4. Equal to control | 2.35–2.55 |
| 5. Worse than control | >2.55 |

The primary conclusions which can be derived from the data presented in Table I are as follows:

1. The prior art silanes and titanates (Examples 2–6) were minimally effective in reducing viscosity, and in some cases detracted from surfactant properties.

2. The long-chain fatty acid esters of $C_1$ to $C_4$ mono and polyhydric alcohols of the present invention (Examples 7–14) showed some improvement in the case of methyl ricinoleate and ricinoleic acid, and still greater improvement in the cases of hydrogenated castor oil and methyl palmitate with slight improvement for methyl acetyl ricinoleate and methyl oleate.

3. The polyoxyalkylene glycols and mono alkyl ethers thereof, as well as the polyoxyethylene - polyoxypropylene copolymers (Examples 14–21) exhibited significant improvements. For polyoxyethylene compounds, the molecular weight range of 400–1500 was best (i.e. compounds having 10–35 EO units). With much longer chains (Pluronic F108; molecular weight 14,000; EO & PO=300) the rating fell from 2 to 3.

4. Significant improvements were also observed with the polyoxyethylene derivatives of the fatty acid esters of the $C_1$ to $C_4$ mono and polyhydric alcohols (Examples 22–25). Specifically, compounds which initially had a 2–4 rating moved up to 1 when ethylene oxide chains are substituted for the hydroxyl group at the number 12 carbon atom. Chain length is important, however, and highest efficiencies where observed when over 65% ethylene oxide was introduced. The best results were obtained at 80–90% EO. The preferred average EO chain length per hydroxy group thus ranges from approximately 30–75.

EXAMPLES 26–40

Table II below sets forth the results of additional tests conducted to determine the effectiveness of various couplers in accordance with the present invention utilized in connection with $CaCO_3$ fillers. The experimental procedures followed were identical in all respects to that described above with respect to Examples 1–25, the only difference being the substitution of filler.

Although the flow point values are in a different range than the values obtained using an ATH filler, the conclusions are basically the same regarding the usefulness of the above-described compounds as coupling agents in thermoset resin compositions and particularly the beneficial effects of polyoxyalkylene compounds and polyoxyethylene derivatives of long-chain fatty acid esters.

EXAMPLES 41–44

Additional tests were conducted to determine the paste viscosity of SMC polyester formulations as described above utilizing both ATH and calcium carbonate fillers with and without a 1% coating of a coupling agent comprising Surfactol 590. The samples prepared were allowed to equilibrate for one hour in a 28° C. constant temperature water bath. This interval also permitted some entrapped air to escape from the paste. Once equilibrated, the viscosity of the paste was measured using a Brookfield HBT equipped with #6 spindle and rotating at 20 rpm. The results at the various levels of filler tested are set forth in Table III with the corresponding percentage drops in viscosity being set forth in Table IV. As can readily be appreciated from the data in Tables III and IV, significant reductions in viscosity are achieved when utilizing a coating of Surfactol 590 over similar compounds where no coupler is utilized. In fact, at higher load levels more significant reductions in viscosity are found to exist.

In order to determine the physical properties of molded products utilizing fillers treated with surfactant coupling agents in accordance with the present invention and to compare same with similar products utilizing prior art silanes (Dow Chemical Carbide Silane DSC-20), immediately upon preparation of the paste, 1 phr magnesium hydroxide and 1 phr catalyst were added thereto and the paste sheared for an additional 1 to 2 minutes. The paste was then transferred to a dough mixer where, using a dough hook, 15% by weight of ¼ inch fiber glass (Owens Corning OCF-832) was added. After complete wet-out the reinforced paste was formed into a 1 to 2 inch sheet and wrapped in polyethylene and aluminum foil. The sheet was allowed to pre-cure for a period of approximately three days until moldable viscosity is reached and then 2½'×6'×⅛' molds are made using a Pasadena press at 750 to 1000 psi, 300° F., for 2 to 3 minutes. The molded specimens are then cut and tested for various physical properties following ASTM standard methods. The results obtained using samples of cured pastes containing 200 phr of treated filler are set forth in Table V. As can be appreciated from the data in Table V, the samples produced in accordance with the present invention showed a higher impact strength both before and after boiling of the sample for 8 hours, as well as a greatly reduced percentage drop in impact strength as a result of boiling over that obtained in a similar composition utilizing a prior art silane as the coupler. Similar results were achieved for flexural strength (Example 46). In the case of flexural modulus, although a greater percentage drop was observed after boiling, the flexural modulus in the case of the sample produced in accordance with the present invention before boiling was greater than that of the prior art specimens, and after boiling, the same as the prior art specimen (Example 47).

EXAMPLES 48-51

Experiments were conducted to determine the effectiveness of the coupling agents of the present invention in the preparation of thermoset laminating resins. The effectiveness of the coupling agents was determined by measuring the reduction in viscosity of the resin paste composites. In all cases, the composition of the filled laminating system was 300 parts polyester laminating resin (Synrez 35.3 manufactured by Synrex Chemical Corp.), 400 parts aluminum trihydrate (ATH) filler, and 21 parts coupling agent. The resin and ATH were mixed and blended for 5 minutes and the coupler then added. An additional 5 minutes of blending was continued prior to measurement of viscosity of the composite. Viscosities were measured with a Brookfield viscometer at 77° F. using a #3 spindle at 2 rpm and 20 rpm rotation. The viscosities were also obtained for a control blend which contained only resin and ATH without the coupler. The results of such tests indicating the viscosities of the samples tested in centipoise (CPS) are set forth in Table V.

A comparison of the viscosities set forth in Table V shows that the use of coupling agents improves the viscosity from 23.6 to 33.5% over the control at 2 rpm and 23.0–38.8% over the control at 20 rpm.

The invention being thus described, it will be obvious that the same may be varied in many ways, such variations are not to be regarded as a departure from the spirit and scope of the invention, and all such modifications are intended to be within the scope of the following claims.

TABLE I

ATH TREATMENTS

| Example | Compounds Tested | Wet Out | Flow Point | Effectiveness Rating |
|---|---|---|---|---|
| 1 | Control Alcoa 331 | 1.58 ± 0.4 | 2.45 ± .08 | 4 |
| 2 | Dow Z6076 - (chloropropyl) | 2.01 ± 0.5 | 3.22 ± .1 | 5 |
| 3 | Dow Z6032 - (cationic styryl) | 1.95 ± .11 | 2.98 ± .15 | 5 |
| 4 | Dow Z6030 - (methacryloxypropyl) | 1.52 ± .12 | 2.58 ± .10 | 5 |
| 5 | Union Carbide DSC-20 | 1.32 ± .02 | 2.22 ± .04 | 3 |
| 6 | Dow A188 - (vinyl triacetoxy silane) | 1.46 ± .07 | 2.43 ± .09 | 4 |
| 7 | Castor Oil | 1.46 ± .05 | 2.21 ± .07 | 3 |
| 8 | Castor Wax (hydrogenated castor oil) | 1.43 ± .03 | 2.09 ± .01 | 2 |
| 9 | Ricinoleic Acid | 1.39 ± .02 | 2.24 ± .07 | 3 |
| 10 | Flexricin P-1(Me ricinoleate) | 1.38 ± .04 | 2.25 ± .05 | 3 |
| 11 | Flexricin P-4(Me acetyl ricinoleate) | 1.38 ± .10 | 2.42 ± .05 | 4 |
| 12 | Methyl oleate | 1.35 ± .02 | 2.40 ± .02 | 4 |
| 13 | Methyl palmitate | 1.31 ± .04 | 2.17 ± .06 | 2 |
| 14 | Tergitol 15-S-9 | 1.42 ± .06 | 2.26 ± .05 | 3 |
| 15 | Tergitol 15-S-40 | 1.38 ± .04 | 2.27 ± .05 | 3 |
| 16 | Pluronic F108 | 1.37 ± .09 | 2.26 ± .06 | 3 |
| 17 | Pluronic 31RL | 1.35 ± .02 | 2.24 ± .02 | 3 |
| 18 | Pluronic L31 | 1.26 ± .04 | 2.07 ± .04 | 2 |
| 19 | Plurocol E400 | 1.27 ± .03 | 2.02 ± .04 | 2 |
| 20 | Plurocol E600 | 1.39 ± .03 | 2.14 ± .02 | 2 |
| 21 | Plurocol E1500 | 1.40 ± .05 | 2.08 ± .04 | 2 |
| 22 | Surfactol 318 | 1.35 ± 0.5 | 2.27 ± .08 | 3 |
| 23 | Surfactol 365 | 1.41 ± .03 | 2.27 ± .08 | 3 |
| 24 | Surfactol 380 | 1.22 ± .01 | 1.89 ± .02 | 1 |
| 25 | Surfactol 590 | 1.20 ± .01 | 1.97 ± .03 | 1 |

TABLE II

| Ex. | CaCO₃ | Compound Tested | Wet Out | Flow Point |
|---|---|---|---|---|
| 26 | Camel-Wite (Campbell) | None | 1.29 ± .04 | 1.87 ± .02 |
| 27 | | Surfactol 380 | 1.20 ± .07 | 1.79 ± .01 |
| 28 | | Surfactol 590 | 1.24 ± .01 | 1.82 ± .01 |
| 29 | Hi-Pfil 300 (Chas. Pfizer) | None | 1.22 ± .03 | 1.87 ± .01 |
| 30 | | P-1 | 1.15 ± .03 | 1.80 ± .05 |
| 31 | | P4 | 1.18 ± .02 | 1.83 ± .03 |
| 32 | | Pluronic F108 | 1.14 ± .03 | 1.76 ± .05 |
| 33 | | Surfactol 380 | 1.14 ± .06 | 1.77 ± .01 |
| 34 | | Surfactol 590 | 1.04 ± .07 | 1.68 ± .02 |
| 35 | Snowflake (Thomson-Whitaker) | None | 1.23 ± .03 | 1.91 ± .01 |
| 36 | | P-1 | 1.09 ± .01 | 1.72 ± .04 |
| 37 | | P4 | 1.12 ± .01 | 1.81 ± .01 |
| 38 | | Pluronic F108 | 1.09 ± .01 | 1.75 ± .04 |
| 39 | | Surfactol 380 | 1.03 ± .02 | 1.57 ± .06 |
| 40 | | Surfactol 590 | 1.06 ± .05 | 1.69 ± .09 |

TABLE III

VISCOSITY TESTS OF SMC POLYESTER FORMULATION

| EXAMPLE | Filler | Treatment | 140 phr | VISCOSITY 175 phr | 200 phr |
|---|---|---|---|---|---|
| 41 | ATH-Alcoa 331 | None | 29,000 | 74,000 | 150–180,000 |
| 42 | ATH-Alcoa 331 | Surfactol 590 | 22,000 25%* | 55,000 35%* | 118,000 ca.30* |
| 43 | CaCO$_3$-Camel Wite | None | 22,000 | 38,400 | 70,800 |
| 44 | CaCO$_3$-Camel Wite | Surfactol 590 | 18,000 18%* | 29,600 23%* | 43,200 39%* |

*% reduction in viscosity**

** $\frac{\Delta \text{Viscosity}}{\text{Viscosity of Control}}$

TABLE IV

PHYSICAL PROPERTIES ATH - POLYESTER SHEET MOLDING COMPOUND

| | | Surfactol 590 | | | Union Carbide Silane DSC20 | | |
|---|---|---|---|---|---|---|---|
| EXAMPLE | ASTM TEST | Unboiled | 8 hr. Boil | % Drop | Unboiled | 8 hr. Boil | % Drop |
| 45 | Izod, Notched | 5.7 | 4.9 | 14.0 | 4.7 | 3.5 | 25 |
| 46 | Flexural Strength (psi) | 13,265 | 8,956 | 32.4 | 11,095 | 7,185 | 35 |
| 47 | Flexural Modulus | $8.5 \times 10^6$ | $6 \times 10^6$ | 29.4 | $7.2 \times 10^6$ | $6 \times 10^6$ | 17 |

TABLE V

VISCOSITY TESTS ON SPRAY LAMINATE COMPOSITIONS

| EXAMPLE | COMPOUNDS TESTED | Viscosity cps at 2 RPM | cps at 20 RPM |
|---|---|---|---|
| 48 | Control | 10,600 | 3,895 |
| 49 | Methyl acetyl ricinoleate | 8,100 | 2,385 |
| 50 | Methyl ricinoleate | 7,050 | 2,400 |
| 51 | Surfactol 590 | 7,700 | 3,000 |

What is claimed is:

1. A thermosettng resin composition comprising a thermosetting resin, a particulate inorganic mineral filler and a coupling agent, said coupling agent being present in an amount of from about 0.2 to 3% by weight of filler and comprising a polyoxyalkylene glycol ether derivative of a compound selected from the group consisting of mono-, di-, and tri-hydroxy fatty acid esters of C$_1$ to C$_4$ mono- and polyhydric alcohols.

2. The composition of claim 1 wherein said hydroxy fatty acid comprises ricinoleic acid.

3. The composition of claim 1 wherein said hydroxy fatty acid comprises hydroxy stearic acid.

4. The composition of claim 1 wherein said coupling agent comprises a tri-ester of ricinoleic acid having an average of from about 1–100 ethylene oxide units per hydroxy group.

5. The composition of claim 4 including an average of from about 30–75 ethylene oxide units per hydroxy group.

6. The composition of claim 5 including an average of about 31 ethylene oxide units per hydroxy group.

7. The composition of claim 1 wherein said coupling agent comprises a tri-ester of hydroxy stearic acid having an average of from about 1–100 ethylene oxide units per hydroxy group.

8. The composition of claim 7 including an average of from about 30–75 ethylene oxide units per hydroxy group.

9. The composition of claim 7 including an average of about 71 ethylene oxide units per hydroxy group.

10. The composition of claim 1 wherein siad inorganic mineral filler is selected from the group consisting of silicas, metal silicates, metal oxides, hydrated aluminum oxides, antimony trioxide, calcium carbonate and combinations thereof.

11. The composition of claim 1 wherein said coupling agent is present in an amount of from about 0.2 to 3% by weight of said filler.

12. The composition of claim 1 wherein said coupling agent is present in an amount of about 1% by weight of said filler.

13. The composition of claim 1 wherein said thermosetting resin is selected from the group consisting of polyesters, epoxies, polyurethanes, phenolics and melamines.

14. The composition of claim 1 wherein the particulate mineral filler is coated with the coupling agent.

* * * * *

UNITED STATES PATENT AND TRADEMARK OFFICE
CERTIFICATE OF CORRECTION

PATENT NO. : 4,210,572
DATED : July 1, 1980
INVENTOR(S) : Daniel F. Herman et al.

It is certified that error appears in the above—identified patent and that said Letters Patent is hereby corrected as shown below:

Column 6, after line 53, insert ----EXAMPLES 45-47----.

Signed and Sealed this

Twenty-ninth Day of December 1981

[SEAL]

Attest:

GERALD J. MOSSINGHOFF

Attesting Officer     Commissioner of Patents and Trademarks